April 9, 1957 V. F. BRUNING 2,788,142
BALE LOADING DEVICE

Filed Feb. 7, 1955 2 Sheets-Sheet 1

Vincent F. Bruning
INVENTOR.

BY
Attorneys

April 9, 1957
V. F. BRUNING
2,788,142
BALE LOADING DEVICE
Filed Feb. 7, 1955
2 Sheets-Sheet 2
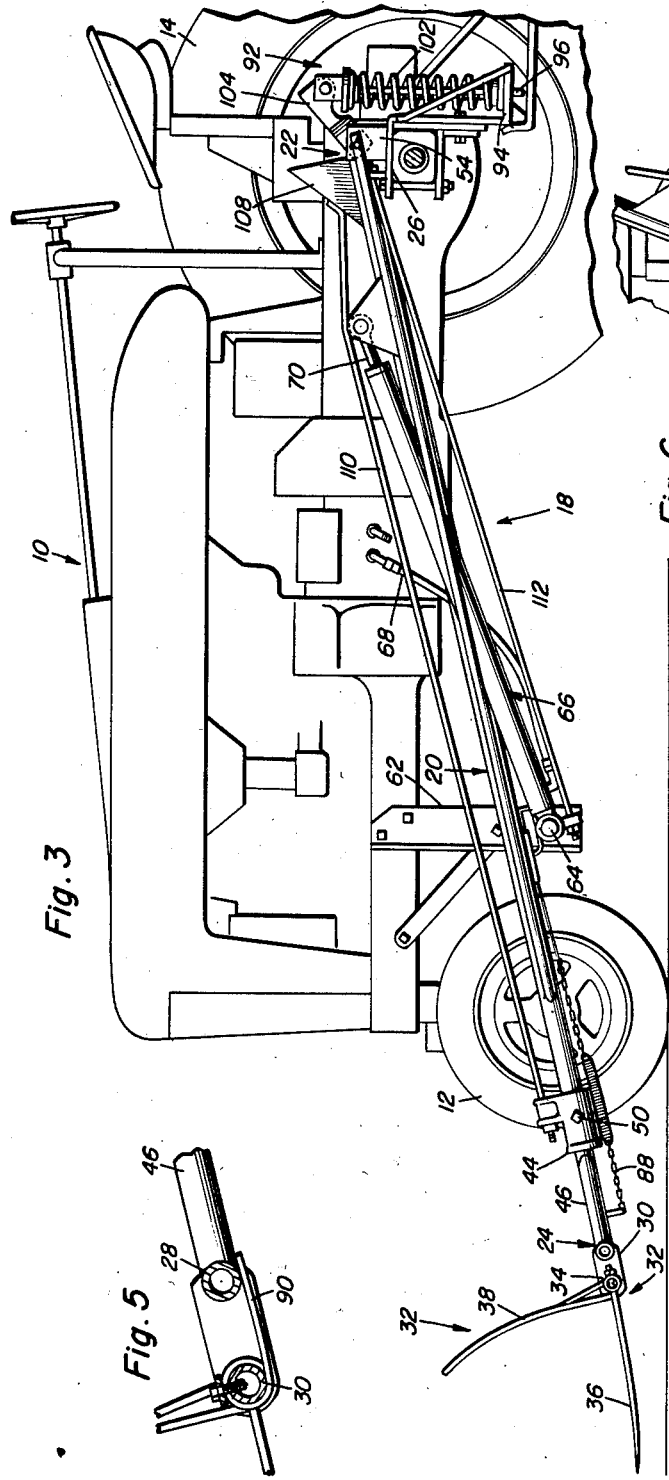
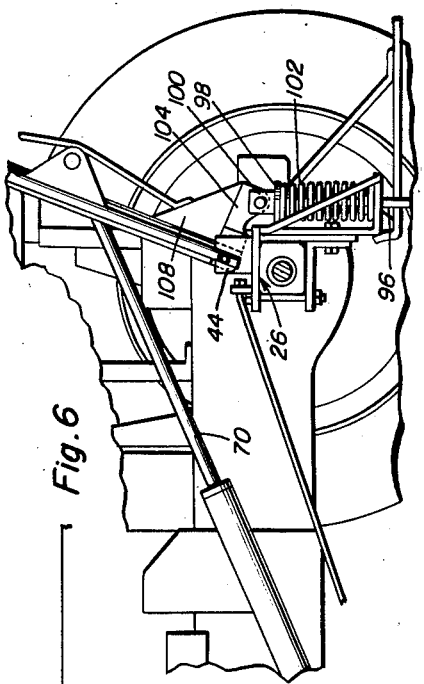
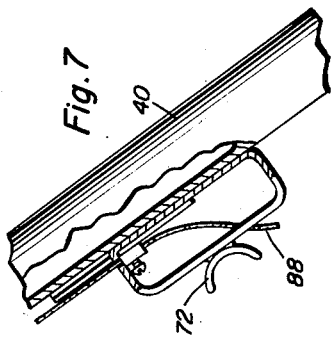
Vincent F. Bruning
INVENTOR.

United States Patent Office 2,788,142
Patented Apr. 9, 1957

2,788,142

BALE LOADING DEVICE

Vincent F. Bruning, Hartington, Nebr.

Application February 7, 1955, Serial No. 486,447

2 Claims. (Cl. 214—140)

The present invention relates to a device for loading hay bales from a lower position to an upper position.

The primary object of the present invention is in the provision of a bale lifting attachment for tractors whereby hay bales may be automatically lifted from a surface to an elevated surface and deposited upon such elevated surface automatically.

It is a highly important object of the present invention to provide an elongated frame member which is adapted to be pivotally mounted at its inner end to a portion of a tractor with a hay fork at the outer end thereof penetrating a hay bale to grip the same and actuated by a fluid operated cylinder piston assembly from the hydraulic system of the tractor to swing the bales upwardly from the ground surface to the desired elevated position.

It is a further important object of the invention, ancillary to the preceding object, to provide a hay fork pivotally attached to the outer end of the elongated frame with means releasably locking the fork against downward swinging movement to prevent dropping of the load by the fork during upward swinging movement of the elongated frame toward a vertical position, which locking means, being unidirectional, will permit the dumping of the load without actuation thereof as the elongated frame passes a vertical over center position.

In connection with the foregoing object, it is a feature of the invention to permit release of the locking means during the upward movement of the elongated frame toward a vertical position to permit dumping of the load from the fork prior to reaching or passing such vertical position.

Another object of the present invention is in the provision of a mounting structure for the inner end of the elongated frame on the tractor, which mounting structure provides a means for yieldingly cushioning the movement of the elongated frame beyond a vertical position, the mounting structure constituting a combination limit stop and shock absorber assembly for such limit stop to define the limit of swinging movement of the elongated frame from its pickup position to its rearmost dumping position.

A final object of the invention to be mentioned specifically is in the provision of an automatic bale lifting attachment for tractors which is exceedingly simple of construction and easily adaptable for mounting on any conventional type tractor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged side elevational view of the tractor with the attachment of the invention mounted thereon taken substantially along the plane of section line 3—3 of Figure 2;

Figure 5 is a cross-sectional view taken through the hay fork substantially along the plane of section line 5—5 of Figure 2 disclosing the resilient restraining means yieldingly retaining the hay fork in position against pivotal movement and returning the hay fork to its pickup position wherein it is engaged by the releasable locking means;

Figure 6 is an enlarged detail view of the mounting bracket and supporting structure for the elongated frame as engaged by the frame when the frame is swung to its rearmost position about the mounting bracket;

Figure 7 is an enlarged detail view with certain parts in cross-section for clarity of detail disclosing a saddle bearing for resting an intermediate portion of the frame on the fluid piston and cylinder tractor support bracket.

Figure 1:
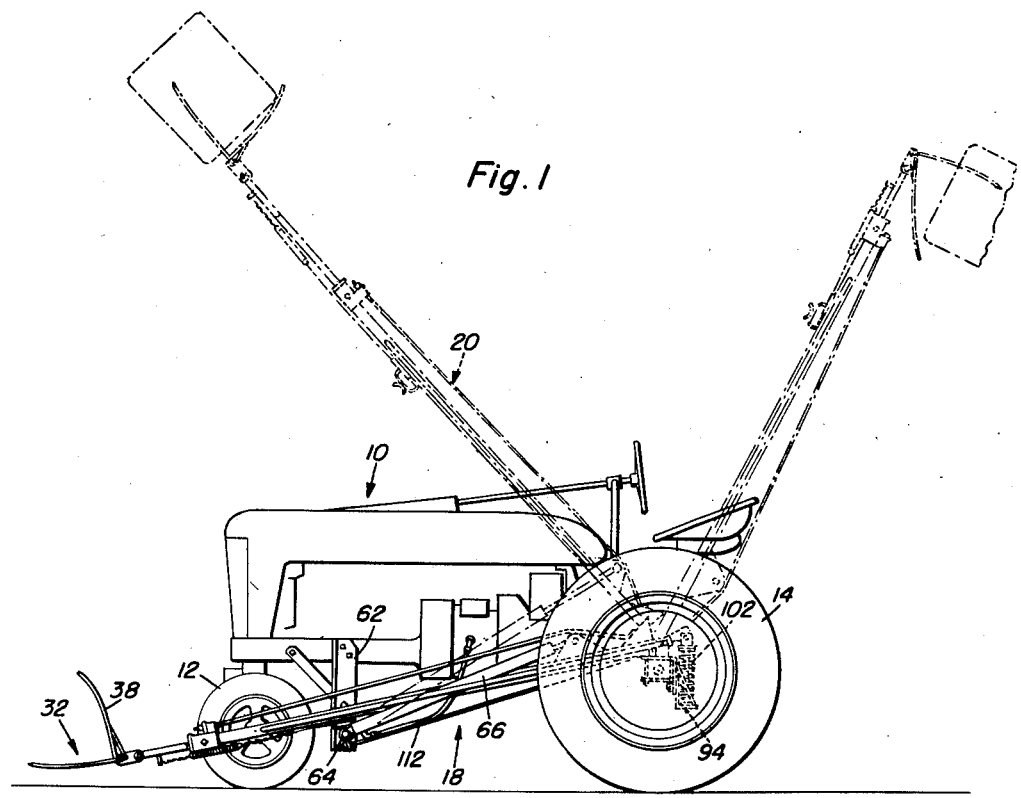
Figure 1 is a side elevational view of a conventional tractor to which the bale lifting device of the present invention is attached, the movement of the bale lifting attachment being shown in phantom outline in this figure.
Figure 2:
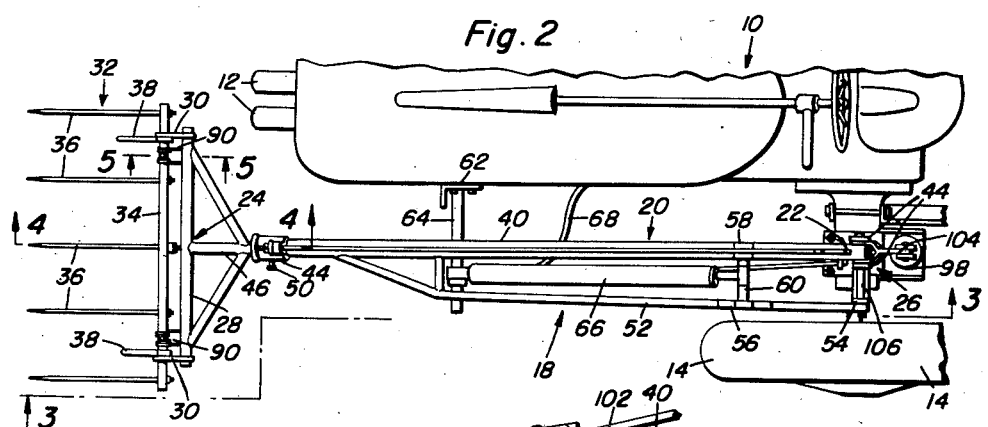
Figure 2 is a top elevational view of the attachment as mounted on the side of the tractor.

Referring now to the drawings in detail, there is shown a conventional tractor 10 having front steering wheels 12 and rear driving wheels 14, the rear driving wheels 14 being journaled to the tractor frame by virtue of the rear axle housings 16. The tractor shown, is of the so-called tricycle type; however, as the description proceeds it will be seen that the bale lifting attachment of the present invention can be applied equally well to other types of tractors such as the four wheel type.

The bale lifting attachment for the tractor 10 constituting the present invention is designated in its entirety by the numeral 18 and with particular reference to Figure 3 may be observed in detail.

The attachment 18 consists essentially of an elongated frame 20 having inner and outer ends 22 and 24 respectively. The inner end 22 is pivotally attached between a pair of upstanding lugs 44 on a mounting bracket 26 which is fixedly attached to the rear axle housing 16 of the tractor to one side of the frame thereof.

The outer end 24 of the frame 20 is provided with an elongated crossbar 28 which has forwardly projecting therefrom adjacent the opposite ends thereof supporting lugs 30. A bale lifting fork 32 has a rear tine supporting bar 34 thereof journaled in suitable apertures in the lugs 30 whereby the fork 32 is pivotally attached to the forward or outer end 24 of the frame 20. At spaced intervals along the tine supporting bar 34 and projecting forwardly therefrom are the tines 36 of the fork. Projecting upwardly from the tine supporting bar 34 at spaced intervals therealong are a pair of back bars 38 which limit the penetration of a hay bale or the like onto the tines 36.

The frame 20 consists essentially of an elongated tubular pipe 40 pivotally attached at its inner end to the upstanding lugs 44 on the mounting bracket 26 previously mentioned.

The forward end of the pipe 40 is provided with a reinforcing collar 44, the purpose of which will become apparent shortly, and slidably received within the tube 40 and projecting through the forward end thereof is a second tubular pipe 46. The inner pipe 46 is provided with longitudinally spaced apertures 48 therein and the collar 44 of the outer tube 40 is provided with an aperture therethrough in line with the threaded aperture in the collar 44. A setscrew 50 through the collar 44 selectively registers with one of the apertures 48 in the inner pipe 46 to fixedly relate the same to the outer pipe 40. With this arrangement, the frame 20 may be extended to deposit bales at different elevations as desired during the operation of the attachment.

Laterally spaced from the outer pipe 40 and extending generally parallel thereto is a bracing frame member 52 which is attached at its forward end adjacent the forward end of the outer pipe 40 and is attached at its rearward end to a suitable lug 54 on the mounting bracket 26.

Adjacent its inner end the bracing element 52 is provided with an upstanding lug 56 which lug is disposed in lateral registry with an upstanding lug 58 adjacent the inner or rearward end of the outer pipe 40 and a crosspiece 60 connects these lugs.

Intermediate the ends of the frame 20, and fixedly attached to the tractor frame is a downwardly depending supporting strap 62 which depends below the frame 20 and is provided at its lower end with a laterally extending rod 64 which rod extends beneath the frame 20 and perpendicularly thereto.

A fluid operated cylinder and piston assembly 66 is pivotally attached at one end thereof to the rod 64 and at the other end thereof to the cross-piece 60 on the frame 20 previously mentioned. The cylinder and piston assembly 66 form an extensible and retractible hydraulic ram which may be suitably operated from the hydraulic system of the tractor by virtue of the hose connection therewith through the hose 68.

The operation is relatively simple, fluid pressure being exerted on the piston within the cylinder extending the plunger 70 from the cylinder and by this extension causing the frame 20 to swing upwardly about its inner end 22 to elevate the hay fork 32.

When in its lowermost position, the outer pipe 40 of the frame 20 is provided with a downwardly extending saddle bearing 72 which seats on the laterally extending rod 64 from the supporting strap 62.

Figure 4:
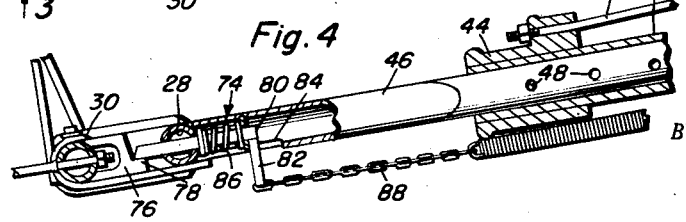
Figure 4 is a longitudinal cross sectional view of the releasable locking mechanism for locking the hay fork of the attachment against swinging movement in one direction.

To prevent downward swinging movement of the hay fork 32 as the same is elevated by upward swinging movement of the frame 20, a releasable locking means 74 is provided which may be most clearly observed in Figure 4. The releasable locking mechanism 74 comprises a keeper member 76 fixedly secured to the tine supporting bar 30 of the fork 32 and having a rearwardly projecting shoulder 78 thereon. A trip rod 80 is slidably retained in the forward end portion of the inner pipe 46 of the frame 20 and projects through suitable apertures in the crossbar 28 to normally seat at its forward end on the shoulder 78.

The trip rod 80 is provided with a handle 82 extending through a suitable slot 84 in the inner pipe 46.

A spring 86 coiled around the trip rod 80 reacts against the handle portion 82 thereof and the crossbar 28 to normally retain the trip rod 80 on the shoulder 78 of the keeper 76.

Flexible chain 88 is attached to the exteriorly projecting free end portion of the handle 82 and extends longitudinally rearwardly along the frame 20 to actuate the trip rod 80.

Yieldingly restraining the fork 32 against swinging movement are elongated wire springs 90 which have the free ends thereof engaged beneath and suitably fixed to the crossbar 28 and the other ends thereof coiled about and suitably terminally fixed to the tine supporting bar 34 of the fork 32. With this construction as the trip rod 80 is retracted to cause the load on the fork 32 to act in opposition to the leaf springs 90 to dump a load, immediately after such dumping, the leaf springs 90 by their connection with the crossbar 28 and bar 34 uncoil to return the fork to its lifting position and the action of the spring 86 again pulls the trip rod 80 forwardly into locking relation with the keeper 76.

A shock absorbing assembly 92 is carried by and at the rear of the mounting bracket 26 and projects thereabove. Depending rearwardly from the mounting bracket 26 is a horizontal supporting plate 94 and an elongated pin 96 slidably extends at its lower end through an aperture in the plate 94 and has fixedly connected at its upper end a plate 98 and a connecting clevis 100. A shock absorbing spring 102 is coiled around the pin 96 and reacts against the plate 98 on the pin and the plate 94 when the frame 20 is swung upwardly.

The clevis 100 at the upper end of pin 96 pivotally carries a clevis pin 104. The bifurcated end of the pin 104 extends between lugs 44 on base 26 and is pivoted to the pivot pin 106 pivotally attaching frame 20 to the base 26.

A fin or abutment plate 108 is attached to pipe 40 at the rear or inner end 22 of the frame 20 and projects upwardly therefrom.

As the frame 20 approaches a vertical position as shown in Figure 6, fin 108 engages clevis pin 104 along the length thereof. Then as the frames swing further toward and finally beyond a vertical position to dump a bale from the fork 32, the fin 108 moves pin 96 downwardly compressing spring 102. Upon release of fluid pressure from the cylinder 66, spring 102 returns the frame 20 toward and past its vertical position whereby it may return by gravity toward the ground.

Suitable tie rods 110 and 112 extend respectively from the collar 44 to the rear end of the frame 20 and from the laterally extending bar 64 to the mounting bracket 26 to longitudinally stiffen the frame.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A bale lifter for a tractor comprising a mounting attachable to a rear axle housing of a tractor, an elongated frame having a rear end pivoted on said mounting for swinging of the frame into upwardly and rearwardly inclined vertical position, a fluid operated extensible cylinder and piston assembly attachable to a tractor and attached to said frame to swing said frame, a cross bar on the front end of said frame, a bale lifter fork pivoted on said cross bar for vertical swinging from a normal position downwardly and rearwardly in response to the weight of a bale thereon in the vertical position of said frame to dump a bale from the fork, and spring means attached to said bar and fork opposing downward and rearward swinging of the fork from normal position in the vertical position of the frame and overcome by the weight of a bale on the fork in the vertical position of said frame.

2. The combination of claim 1, and a vertically swingable spring tensioned member on the pivot of said frame engaged by and yieldingly establishing the vertical position of the frame.

References Cited in the file of this patent

UNITED STATES PATENTS

| 1,149,910 | Gregory et al. | Aug. 10, 1915 |
| 2,193,560 | Lowe et al. | Mar. 12, 1940 |
| 2,268,689 | Andrus | Jan. 6, 1942 |
| 2,438,660 | Garner | Mar. 30, 1948 |
| 2,634,003 | Williamson et al. | Apr. 7, 1953 |

FOREIGN PATENTS

| 722,517 | Great Britain | Jan. 26, 1955 |